(No Model.)
E. F. SCHOLDER.
CORNSTALK CUTTER OR HARVESTER.
No. 407,419. Patented July 23, 1889.
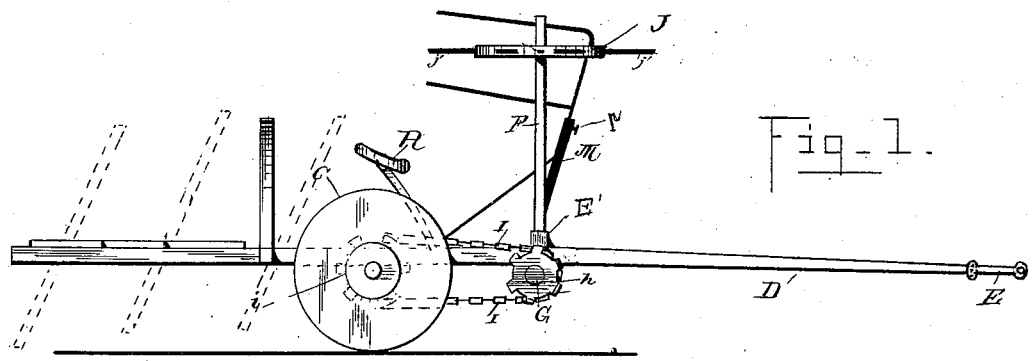
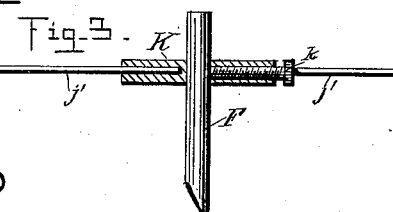
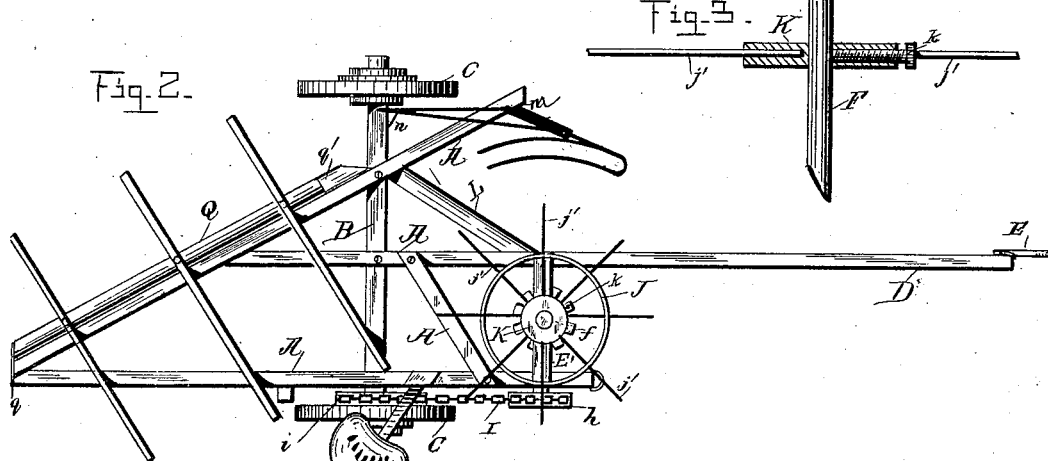
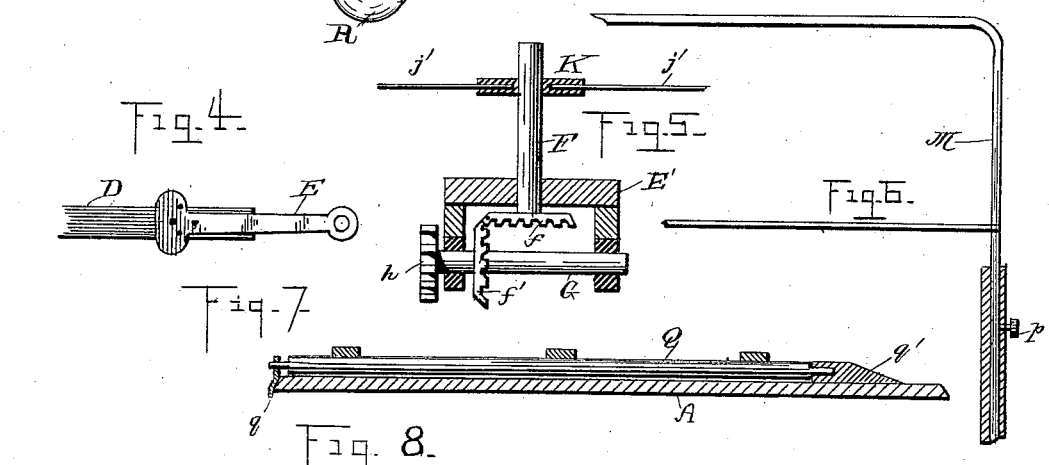
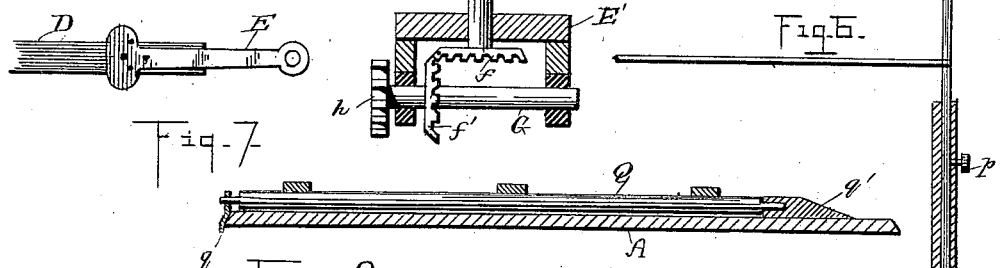
Witnesses
Will E. Hughinbaugh
Hersie Bates
Inventor
Edward F. Scholder
By his Attorney
Wm. C. Bates

UNITED STATES PATENT OFFICE.

EDWARD F. SCHOLDER, OF FORT SCOTT, KANSAS.

CORNSTALK CUTTER OR HARVESTER.

SPECIFICATION forming part of Letters Patent No. 407,419, dated July 23, 1889.

Application filed February 1, 1889. Serial No. 298,354. (No model.)

*To all whom it may concern:*

Be it known that I, EDWARD F. SCHOLDER, a citizen of the United States, residing at Fort Scott, in the county of Bourbon and State of Kansas, have invented certain new and useful Improvements in Cornstalk Cutters or Harvesters; and I do hereby declare the following to be a full, clear, and exact description of the invention, such as will enable others skilled in the art to which it appertains to make and use the same.

This invention relates to improvements in cornstalk cutters or harvesters of that class adapted for cutting or harvesting standing stalks in the field; and the invention consists in the novel construction and combination of the several parts, as will be hereinafter more particularly described, and specifically pointed out in the appended claims.

In the accompanying drawings, to which reference is had, and which fully illustrate my invention, Figure 1 is a side elevation of my improved machine. Fig. 2 is a plan or top view of the same. Figs. 3, 4, 5, 6, and 7 are detailed views thereof. Fig. 8 is a view in cross-section of the knife or cutter.

Similar letters of reference indicate corresponding parts throughout the several figures.

Referring to the drawings, A indicates the body or frame of the machine, which in this example is of V-shaped form and securely mounted upon an axle B, which is supported by the ordinary driving-wheels C C. The central bar of this frame is prolonged into a tongue D, upon the forward or free end of which is secured an adjustable curved clevis E, which is for the purpose of adjusting the tongue higher or lower, as the case may require. Through a perforation in a cross-bar E' or forward end of the frame A is loosely journaled the lower end of a vertical revolving shaft F, having a beveled gear-wheel $f$ upon its lower end, which meshes with a similar gear-wheel $f'$, secured near one end of a horizontal shaft G, which loosely revolves within bearings in the forward end of the frame of the machine and located parallel with and directly beneath the cross-bar E', above referred to. Upon the outer end of this horizontal shaft and parallel with the beveled gear-wheel $f'$ is a sprocket-pinion $h$, over which passes a sprocket-chain I onto a larger sprocket-pinion $i$, secured upon the inner face of one of the driving-wheels C, which serves to impart motion from the driving-wheels C and sprocket-pinion $i$ to the smaller sprocket-pinion $h$, and revolves the horizontal shaft G, which in turn, through its beveled gear-wheel $f'$, meshing with the beveled gear-wheel $f$, imparts motion to the vertical revolving shaft F and a reel adjustably secured thereon, which will be hereinafter referred to.

Loosely and adjustably secured upon the vertical revolving shaft F, and revolving with it, is a reel composed of an annulus or ring J, having a series of equidistant perforations therein, through which are passed a series of equidistant rods $j'$, having their inner ends secured within perforations which are also equidistant in the periphery of an adjustable disk K, loosely and adjustably secured to the revolving shaft F, by means of a set-screw $k$. (Clearly shown in Fig. 3 of the drawings.)

L indicates a knife or cutter having one of its ends secured to the forward part of the body or frame of the machine near the center thereof, and the other end secured to the under side of the body or frame of the machine near the axle B, having its cutting-edge slightly inclined upward and arranged obliquely relatively with the draft of the machine, whereby its cutting-edge is presented obliquely or diagonally to the stalks and gives a "shearing cut," as shown in Fig. 2 of the drawings.

M indicates a guard or fender constructed of wire and vertically or nearly vertically arranged upon the frame of the machine, having its lower end secured, respectively, to the end of the axle B and forward part of the body of the machine, as at $n$ and $m$. The standard portion of the fender is tubular and the wire portion inserted therein and made adjustable within the tubular standard by means of a set-screw $p$, as shown in Fig. 6 of the drawings. The object of this fender is to keep the cornstalks well up against the reel to be thrown upon a dropper. The reel is intended to revolve in a line midway between the horizontal bars of the fender.

Q indicates a dropper, which is journaled in bearings $q$ $q'$, secured to the diagonal bar of the frame or body of the machine. Upon this dropper cornstalks fall after being cut by the knife L, and are dumped upon the ground by the operator raising the dropper up and over into the position shown in dotted lines in Fig. 1, which dumps them upon the ground aforesaid in a diagonal position relatively to the path of the machine. The journaling of this dropper is more clearly shown in Fig. 7 of the drawings.

A suitable driver's seat R is secured to one side near the forward part of the machine.

My corn-harvester thus constructed is extremely cheap and simple, is very strong and durable, is easily operated by boy or man, and will be found of great utility by farmers.

Having thus described my invention, what I claim as new, and desire to secure by Letters Patent, is—

1. The combination of the V-shaped carriage-frame, the angularly-disposed knife L, connected to the forward part thereof, and the diagonally-pivoted dropper Q, located at the rear of the knife for discharging the stalks, substantially as described.

2. The combination of the V-shaped carriage-frame, the angularly-disposed knife L, connected to the forward part thereof, diagonally-pivoted dropper Q behind the knife, vertically-adjustable fender M, and vertically-adjustable reel $j'$ $j'$ K, whereby the stalks as they are cut by the knife are reeled onto the dropper and discharged from the carriage, substantially as described.

3. The combination of the V-shaped carriage-frame A, angularly-disposed knife L, connected to the forward part thereof, the diagonally-pivoted dropper Q, located at the rear of the knife, the vertically-adjustable fender or guard M, secured to the forward part of the carriage and near one end of the axle, the vertically-adjustable reel $j'$ $j'$ K, adjusted by the set-screw $k$, said reel being located at the forward part of the carriage A and adjustably secured to the vertical shaft F, having gear-wheel $f$ secured upon its lower end and meshing with gear-wheel $f'$ upon and near the end of the transverse shaft G, sprocket-pinions $h$ $i$, and sprocket-chain I, all arranged and operated substantially as described, and for the purposes set forth.

In testimony whereof I affix my signature in presence of two witnesses.

EDWARD F. SCHOLDER.

Witnesses:
EWELL A. DICK,
WM. H. BATES.